US012432280B2

(12) United States Patent
Lurong et al.

(10) Patent No.: US 12,432,280 B2
(45) Date of Patent: Sep. 30, 2025

(54) METHOD AND APPARATUS FOR ESTABLISHING NETWORK CONNECTION, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Dingzhu Lurong, Shenzhen (CN); Lei Peng, Shenzhen (CN); Yongfu Sun, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 46 days.

(21) Appl. No.: 18/589,571

(22) Filed: Feb. 28, 2024

(65) Prior Publication Data
US 2024/0205297 A1 Jun. 20, 2024

Related U.S. Application Data

(63) Continuation of application No. PCT/CN2023/107539, filed on Jul. 14, 2023.

(30) Foreign Application Priority Data

Sep. 13, 2022 (CN) .......................... 202211109508.6

(51) Int. Cl.
*H04L 67/141* (2022.01)
*H04L 67/143* (2022.01)

(52) U.S. Cl.
CPC .......... *H04L 67/141* (2013.01); *H04L 67/143* (2013.01)

(58) Field of Classification Search
None
See application file for complete search history.

(56) References Cited

U.S. PATENT DOCUMENTS 10,742,498 B2 * 8/2020 Subramanian ...... H04L 41/0816
10,749,943 B1 * 8/2020 Feiguine ............. H04L 41/0895
(Continued)

FOREIGN PATENT DOCUMENTS

| CN | 108667777 A | 10/2018 |
| CN | 111913875 A | 11/2020 |
| CN | 114666306 A | 6/2022 |

OTHER PUBLICATIONS

The World Intellectual Property Organization (WIPO) International Search Report for PCT/CN2023/107539 Sep. 19, 2023 6 Pages (including translation).

*Primary Examiner* — Ranodhi Serrao
(74) *Attorney, Agent, or Firm* — Anova Law Group, PLLC

(57) ABSTRACT

A method includes selecting, based on selectable tag(s) carried by a network connection object, selectable application instance(s) corresponding to the selectable tag(s), respectively, from original application instance(s); selecting excludable application instance(s) from the original application instance(s) based on exclusion indication information carried by the network connection object; deleting one or more of the selectable application instance(s) based on the excludable application instance(s), to obtain candidate application instance(s) associated with a first service network and a second service network; selecting, based on a running status corresponding to each of the candidate application instance(s), target application instance(s) that meet a running condition, from the candidate application instance(s); and establishing, by the controller, a network connection (Continued)

between the first service network and the second service network based on the target application instance(s).

18 Claims, 10 Drawing Sheets

(56) References Cited

U.S. PATENT DOCUMENTS

| | | | |
|---|---|---|---|
| 2014/0146731 A1 | 5/2014 | Hynell et al. | |
| 2016/0140031 A1 | 5/2016 | Sun et al. | |
| 2020/0274938 A1* | 8/2020 | Shah | H04L 67/53 |
| 2020/0296173 A1* | 9/2020 | Feiguine | G06F 9/5072 |
| 2020/0314191 A1* | 10/2020 | Madhavan | H04L 41/0853 |
| 2020/0328941 A1* | 10/2020 | Feiguine | H04L 41/40 |
| 2020/0404059 A1* | 12/2020 | Feiguine | H04L 67/51 |
| 2021/0028981 A1* | 1/2021 | Subramanian | H04L 41/0816 |
| 2021/0034431 A1* | 2/2021 | Bar Oz | H04L 67/02 |

* cited by examiner

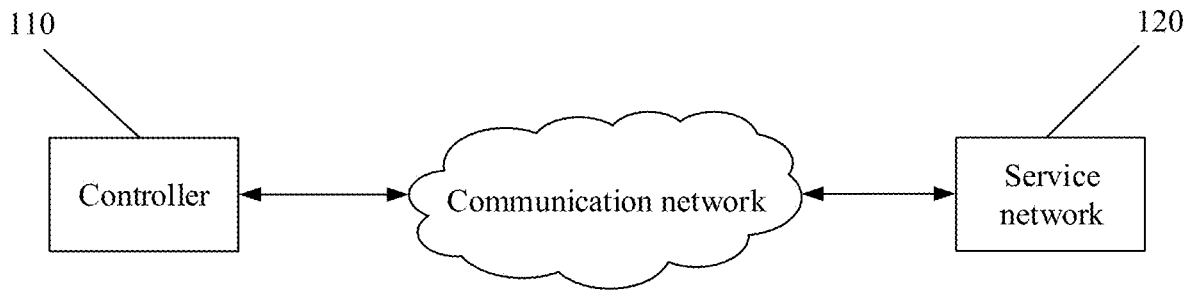

A controller selects, based on each selectable tag carried by a created network connection object, a selectable application instance corresponding to each selectable tag from each preset original application instance, and selects each to-be-excluded application instance from each original application instance based on exclusion indication information carried by the network connection object

S21

The controller deletes a corresponding selectable application instance from each selectable application instance based on each selected to-be-excluded application instance, to obtain each candidate application instance associated with a first service network and a second service network

S22

The controller selects, based on a running status corresponding to each candidate application instance, each target application instance that meets a preset running condition from each candidate application instance

S23

The controller establishes a network connection between the first service network and the second service network based on each target application instance

FIG. 2A

METHOD AND APPARATUS FOR ESTABLISHING NETWORK CONNECTION, ELECTRONIC DEVICE, AND STORAGE MEDIUM

CROSS-REFERENCE TO RELATED APPLICATIONS

This application is a continuation of International Application No. PCT/CN2023/107539, filed on Jul. 14, 2023, which claims priority to Chinese Patent Application No. 202211109508.6 filed on Sep. 13, 2022, the entire contents of which are incorporated herein by reference.

FIELD OF THE TECHNOLOGY

This application relates to the field of network technologies, and in particular, to a method and an apparatus for establishing a network connection, an electronic device, and a storage medium.

BACKGROUND OF THE DISCLOSURE

Currently, with the development of network technologies, a network environment in which a service network is located is becoming more and more changeable.

When network environments in which service networks are located are different, a network connection may usually be established by invoking an external service interface. For example, when a network environment of a first service network is different from a network environment of a second service network, a network connection between the first service network and the second service network may be established by invoking the external service interface.

However, when the network environment is very complex, implementation logic of the external service interface for establishing a network connection also becomes very complicated, and the implementation logic of the external service interface invoked when the network connection is established between different service networks is also different. Consequently, resource consumption when the network connection is established in this manner is too high, and the scalability is not high.

SUMMARY

In accordance with the disclosure, there is provided a network connection establishing method including selecting, by a controller based on one or more selectable tags carried by a network connection object, one or more selectable application instances corresponding to the one or more selectable tags, respectively, from one or more original application instances; selecting, by the controller, one or more excludable application instances from the one or more original application instances based on exclusion indication information carried by the network connection object; deleting, by the controller, one or more of the one or more selectable application instances based on the one or more excludable application instances, to obtain one or more candidate application instances associated with a first service network and a second service network; selecting, by the controller based on a running status corresponding to each of the one or more candidate application instances, one or more target application instances that meet a running condition, from the one or more candidate application instances; and establishing, by the controller, a network connection between the first service network and the second service network based on the one or more target application instances.

Also in accordance with the disclosure, there is provided an electronic device including one or more processors and one or more memories storing one or more program codes that, when executed by the one or more processors, cause the one or more processors to select, based on one or more selectable tags carried by a network connection object, one or more selectable application instances corresponding to the one or more selectable tags, respectively, from one or more original application instances; select one or more excludable application instances from the one or more original application instances based on exclusion indication information carried by the network connection object; delete one or more of the one or more selectable application instances based on the one or more excludable application instances, to obtain one or more candidate application instances associated with a first service network and a second service network; select, based on a running status corresponding to each of the one or more candidate application instances, one or more target application instances that meet a running condition, from the one or more candidate application instances; and establish a network connection between the first service network and the second service network based on the one or more target application instances.

Also in accordance with the disclosure, there is provided a non-transitory computer-readable storage medium storing one or more program codes that, when executed by one or more processors, cause the one or more processors to select, based on one or more selectable tags carried by a network connection object, one or more selectable application instances corresponding to the one or more selectable tags, respectively, from one or more original application instances; select one or more excludable application instances from the one or more original application instances based on exclusion indication information carried by the network connection object; delete one or more of the one or more selectable application instances based on the one or more excludable application instances, to obtain one or more candidate application instances associated with a first service network and a second service network; select, based on a running status corresponding to each of the one or more candidate application instances, one or more target application instances that meet a running condition, from the one or more candidate application instances; and establish a network connection between the first service network and the second service network based on the one or more target application instances.

BRIEF DESCRIPTION OF THE DRAWINGS

FIG. 1 is a schematic diagram showing an application scenario according to an embodiment of this application.

FIG. 2A is a schematic flowchart showing establishing a network connection according to an embodiment of this application.

DESCRIPTION OF EMBODIMENTS

Figure 2B:
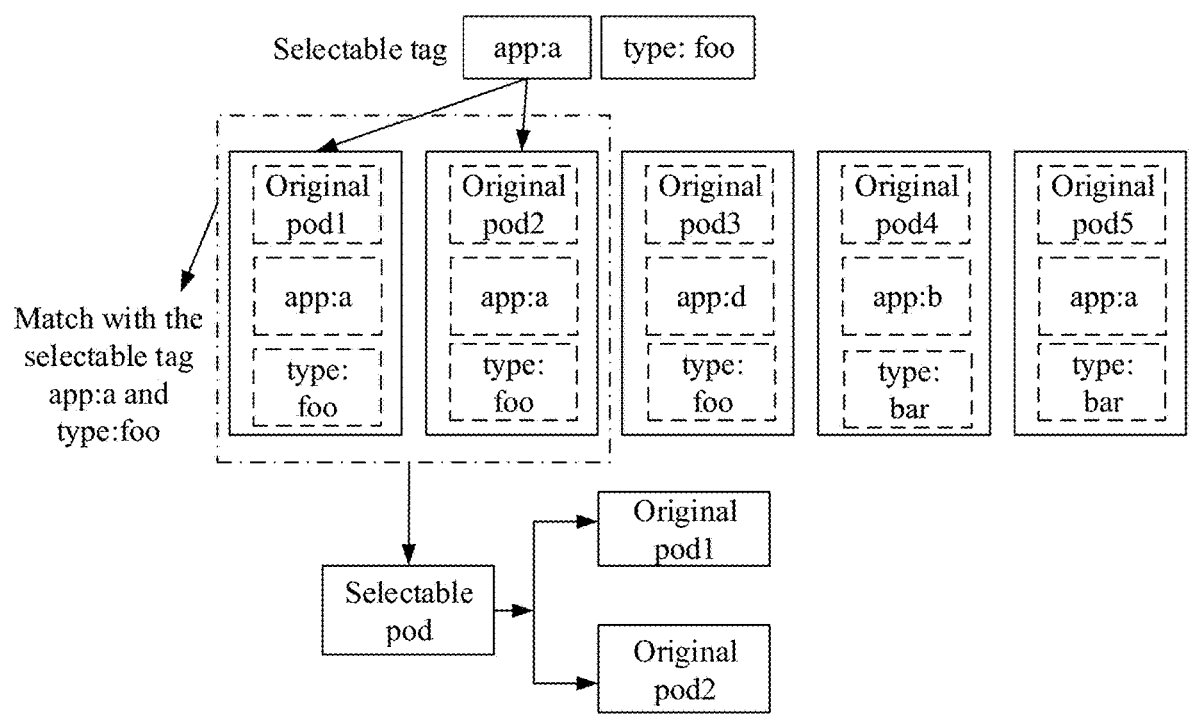
FIG. 2B is a schematic diagram showing determining a candidate application instance according to an embodiment of this application.

The technical solutions in embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

To make the objectives, technical solutions, and advantages of the embodiments of this application clearer, the following describes the technical solutions of this application with reference to the accompanying drawings in the embodiments of this application. Apparently, the described embodiments are some rather than all of the embodiments of the technical solutions of this application. All other embodiments obtained by a person of ordinary skill in the art based on the embodiments recorded in the document of this application without creative efforts shall fall within the protection scope of the technical solutions of this application.

In the specification, claims, and accompanying drawings of this application, the terms "first," "second," and the like are intended to distinguish between similar objects but do not necessarily indicate a specific order or sequence. It should be understood that the data so used may be interchanged in an appropriate condition, so that the embodiments of the present invention described herein can be implemented in an order other than those illustrated or described herein.

The following describes some terms in the embodiments of this application, to facilitate understanding of a person skilled in the art.

Application instance: An application instance may be a pod. A pod is a smallest deployable computing unit created and managed in k8s and is an application set configured for providing a network service to a first service network and a second service network.

Service network: It represents an isolated network capable of providing a service, for example, the first service network and the second service network are isolated from each other.

Probe configuration status: It represents whether a candidate application instance is configured with a probe. The probe configuration status may be divided into configured and unconfigured. That the probe configuration status is configured represents that the candidate application instance is configured with the probe, and that the probe configuration status is unconfigured represents that the candidate application instance is unconfigured with a probe.

Probe: A probe is configured to obtain a detection result of whether a candidate application instance is in a state in which a network service can be provided normally.

Probe detection result: It is configured for representing a detection result corresponding to a candidate application instance determined by a probe, and configured for determining whether the candidate application instance is in a state of normally providing a network service. The probe detection result includes success, failure, and unknown. The probe detection result is success, which represents that the candidate application instance is in the state of normally providing a network service, and the candidate application instance can provide a normal network service. The probe detection result is failure, which represents that the candidate application instance is not in the state of normally providing a network service, and the candidate application instance cannot provide a normal network service. The probe detection result is unknown, which represents that the candidate application instance makes an error during running and cannot know the availability of a network service.

Tuning: It is to complete tuning of a specific type of resource, and an objective is to maintain a state expected by a user.

Customer Resource (CR): It is configured for extending and implementing a custom logic. In the embodiments of this application, it is configured for implementing a scalable network connection definition and a status.

Finalizer: It is an attribute of a network connection object in k8s, and can prevent the network connection object from being actually deleted and keep the network connection object stuck in a Terminating status. The network connection object is not actually deleted until the Finalizer is removed.

Service: An abstract method in k8s that exposes applications that logically run on an application instance set as network services.

The following briefly describes design ideas of the embodiments of this applications:

Currently, with the development of network technologies, a network environment in which a service network is located is becoming more and more changeable.

When network environments in which service networks are located are different, a network connection between network services may sometimes be established by invoking an external service interface. For example, when a network environment of a first service network is different from a network environment of a second service network, a network connection between the first service network and the second service network may be established by invoking the external service interface.

In addition, the network connection manner sometimes can support only four types of network connections, that is, ClusterIP, NodePort, LoadBalancer, and ExternalName.

1. ClusterIP: A service is exposed via an internal IP of a cluster, and the service is accessible only within the cluster when the value is selected. This is also a default ServiceType.

2. NodePort: A service is exposed via an IP and a static port (NodePort) on each node. The NodePort service is routed to the automatically created ClusterIP service. The NodePort service may be accessed from outside the cluster by requesting <node IP>:<node port>.
3. LoadBalancer: A service is exposed externally via a load balancer of a cloud provider. The external load balancer may route traffic to the automatically created NodePort service and the ClusterIP service.
4. ExternalName: A service may be mapped to content of an externalName field (for example, foo.bar.example.com) by returning a CNAME and a corresponding value. There is no need to create any kind of proxy.

However, due to different service scenarios and network environments, invoking logic of external service interfaces is greatly differentiated. A link for creating a network request is relatively complex and is usually implemented in a plurality of processes. Moreover, implementation logic of external service interfaces invoked when a network connection is established between different service networks is also different. Consequently, the reentrancy of the network connection cannot be guaranteed, the resource consumption when the network connection is established is too high, and the scalability is not high. In addition, after the network connection is created, it is impossible to determine the availability of an RS that actually provides services on a backend, that is, even if the backend RS fails for some reason, traffic is still allocated to the RS, resulting in instability and reliability of network services provided by the network connection.

To resolve the foregoing problems, the embodiments of this application provide a method and an apparatus for establishing a network connection, an electronic device, and a storage medium. Each selectable application instance can be selected through each selectable tag. Through exclusion indication information, each to-be-excluded application instance (also referred to as "excludable application instance") can be selected and each to-be-excluded application instance can be deleted from each selectable application instance, to obtain each candidate application instance. In addition, based on a corresponding running status of each candidate application instance, each target application instance is determined, and a network connection is established based on each target application instance. In this way, the scalability can be improved and the network resource consumption can be reduced.

The following describes some embodiments of this application with reference to the accompanying drawings of the specification. It is to be understood that the embodiments described herein are merely used for illustrating and explaining this application, but are not intended to limit this application. In addition, the embodiments of this application and features in the embodiments may be mutually combined in a case of no conflict.

FIG. 1 is a schematic diagram showing an application scenario according to an embodiment of this application. The application scenario includes a controller 110 and one or more service networks 120. The controller 110 may communicate with the one or more service networks 120 via a communication network.

The controller 110 may include one or more processors, a memory, and an I/O interface for interacting with the service network 120. The controller 110 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The controller 110 and the one or more service networks 120 may be connected directly or indirectly in a wired or wireless communication manner. This is not limited in this embodiment of this application.

Each service network 120 is configured to provide a network service.

The method for establishing a network connection in this embodiment of this application may be performed on the controller 110. When the controller 110 establishes a network connection, the controller 110 selects each selectable application instance through each selectable tag, selects each to-be-excluded application instance, through exclusion indication information and deletes each to-be-excluded application instance from each selectable application instance, to obtain each candidate application instance, determines each target application instance based on a corresponding running status of each candidate application instance, and establishes a network connection between a first service network and a second service network based on each target application instance.

The method in the embodiments of this application is applicable to a cloud native scenario. With the development of cloud native technologies, more and more services are moving to the cloud to enjoy advantages of cloud native. A problem that needs to be resolved is how to access a corresponding cloud native service across network environments. In the related art, respective network connection services are usually packaged and implemented internally by invoking external network services. All implementations are outside the cloud native k8s, which makes it impossible to perceive a running status of backend application instances in real time to dynamically maintain the application instances and ensure high reliability of the network services. In view of this, in this embodiment of this application, a selectable application instance corresponding to each selectable tag is selected from each preset original application instance based on each selectable tag carried by a created network connection object, and each to-be-excluded application instance is selected from each original application instance based on exclusion indication information carried by the network connection object. A corresponding selectable application instance is deleted from each selectable application instance based on each selected to-be-excluded application instance, and each candidate application instance associated with a first service network and a second service network is obtained. Each target application instance that meets a preset running condition is selected from each candidate application instance respectively based on a corresponding running status of each candidate application instance. Based on each target application instance, a network connection is established between the first service network and the second service network, so that the running status of the backend application instance can be perceived and the application instance can be dynamically maintained, which not only ensures the high reliability of network services, but also reduces the resource consumption.

The solutions provided in the embodiments of this application involve technologies such as establishing a network connection, which are specifically explained through the following embodiments.

Based on the foregoing embodiments, FIG. 2A is a schematic flowchart showing establishing a network connection according to an embodiment of this application. The following is a description of a process of establishing a network connection in this embodiment of this application, which specifically includes the following processes.

S20: A controller selects, based on each selectable tag carried by a created network connection object, a selectable application instance corresponding to each selectable tag from each preset original application instance, and selects each to-be-excluded application instance from each original application instance based on exclusion indication information carried by the network connection object.

In this embodiment of this application, a network connection request is submitted to an API server through a client, and the API server performs legality verification on the created network connection request. If it is determined that the legality verification on the network connection request passes, the API server creates a network connection object based on the network connection request. When determining the created network connection object, because the network connection object carries various selectable tags, the controller selects each original application instance corresponding to each selectable tag from each preset original application instance based on each selectable tag, where each selected original application instance is each selectable application instance, and because the network connection object carries each exclusion indication information, the controllers may select each original application instance corresponding to the exclusion indication information from each preset original application instance based on the exclusion indication information, where each selected original application instance is each to-be-excluded application instance.

The following describes a process of selecting each selectable application instance in this embodiment of this application. Specifically, the network connection request is received. The network connection request carries selection indication information. The selection indication information includes each selectable tag. Therefore, each selectable tag matches an application instance tag corresponding to each preset original application instance, an original application instance whose application instance tag matches each selectable tag is determined from each original application instance, and the determined original application instance is used as a corresponding selectable application instance.

For example, FIG. 2B is a schematic diagram showing determining a selectable application instance according to an embodiment of this application. Assuming that an application instance is a pod, selectable tags are "app:a" and "type:foo" respectively, preset original pods are original pod1, original pod2, original pod3, original pod4, and original pod5 respectively, application instance tags corresponding to original pod1 are "app:a" and "type:foo," application instance tags corresponding to original pod2 are "app:a" and "type:foo," application instance tags corresponding to original pod3 are "app:d" and "type:foo," application instance tags corresponding to original pod4 are "app:b" and "type:bar," and application instance tags corresponding to original pod5 are "app:a" and "type:bar." Therefore, original pods whose application instance tags match the selectable tags "app:a" and "type: foo" are determined as original pod1 and original pod2. Therefore, original pod1 and original pod2 are respectively used as selectable tags.

The selectable tag may be, for example, a preset attribute tag or a key-value pair. This is not limited in this embodiment of this application.

The attribute tag may be a version tag, an environment tag, an architecture tag, a partition tag, or the like. This is not limited in this embodiment of this application.

In this embodiment of this application, there may be one or more original application instances corresponding to the selectable tag, that is, a plurality of original application instances may correspond to the same selectable tag, and each selectable application instance may correspond to a plurality of selectable tags. This is not limited in this embodiment of this application.

The following describes a process of selecting each to-be-excluded application instance in this embodiment of this application. Specifically, because the network connection request carries the exclusion indication information, each to-be-excluded application instance may be determined from each original application instance based on the exclusion indication information.

In some embodiments, this embodiment of this application provides a possible implementation for determining each to-be-excluded application instance, which specifically includes the following processes:

N1: The controller selects, based on each exclusion tag included in the exclusion indication information, a to-be-excluded application instance corresponding to each exclusion tag from each original application instance.

In this embodiment of this application, each exclusion tag matches an application instance tag corresponding to each preset original application instance, and an original application instance whose application instance tag matches each exclusion tag is determined from each original application instance. The determined original application instance is used as the corresponding to-be-excluded application instance. In this way, the to-be-excluded application instance can be determined, thereby ensuring the high availability of subsequent network services.

N2: The controller determines, based on each first application instance identifier included in the exclusion indication information, a to-be-excluded application instance corresponding to a corresponding first application instance identifier from each original application instance.

In this embodiment of this application, the network connection object further carries a to-be-excluded list. The to-be-excluded list includes each first application instance identifier. Based on each first application instance identifier, a to-be-excluded application instance corresponding to each first application instance identifier is determined.

Figure 2C:
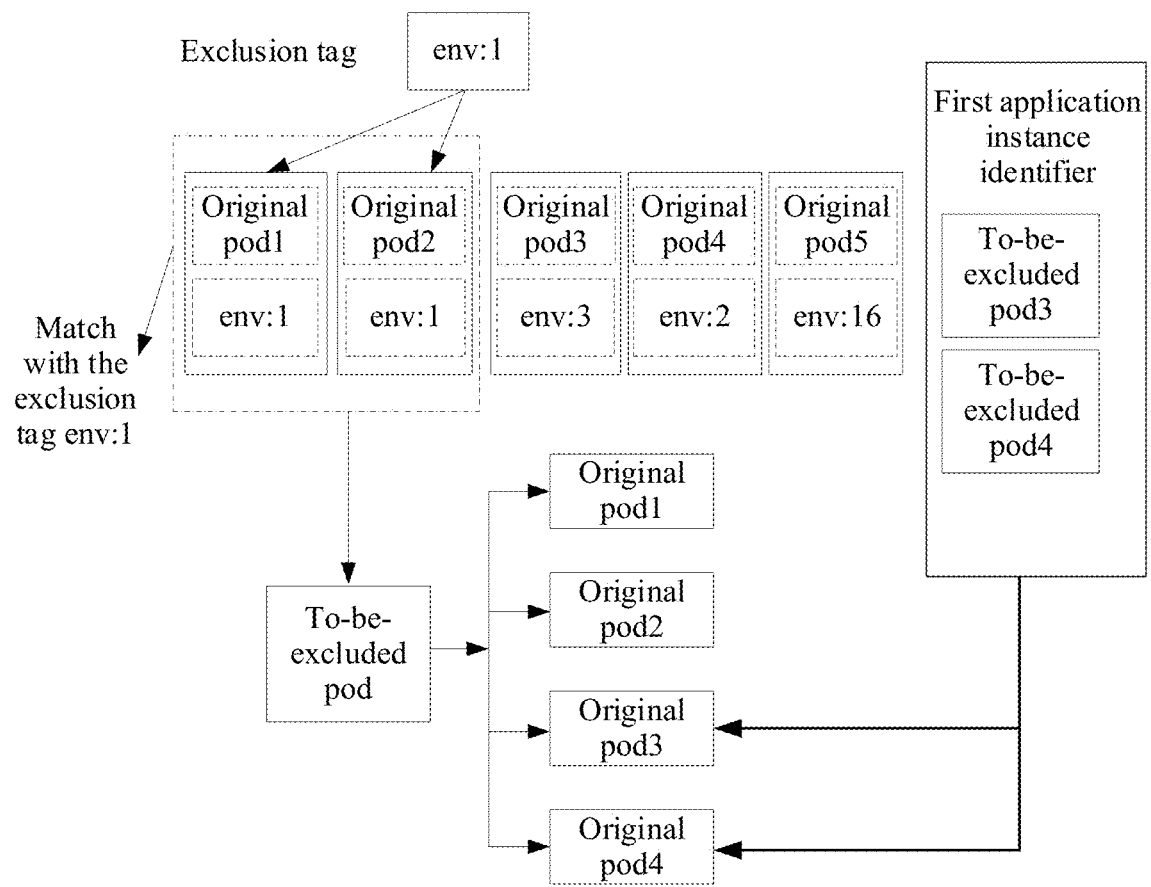
FIG. 2C is a schematic diagram showing determining a to-be-excluded application instance according to an embodiment of this application.

For example, FIG. 2C is a schematic diagram showing determining a to-be-excluded application instance according to an embodiment of this application. Assuming that an application instance is a pod, an exclusion tag is "env:1," and first application instance identifiers included in the exclusion indication information are a first application instance identifier corresponding to to-be-excluded pod3 and a first application instance identifier corresponding to to-be-excluded pod4, preset original pods are original pod1, original pod2, original pod3, original pod4, and original pod5 respectively, an application instance tag corresponding to original pod1 is "env:1," an application instance tag corresponding to original pod2 is "env:1," an application instance tag corresponding to original pod3 is "env:3," an application instance tag corresponding to original pod4 is "env:2," and an application instance tag corresponding to original pod5 is "env:16." Therefore, original pods whose application instance tags match the exclusion tag "env:1" are determined as original pod1 and original pod2, and original pod1 and original pod2 are respectively used as the to-be-excluded pods. In addition, to-be-excluded pods determined based on each first application instance identifier included in the exclusion indication information are to-be-excluded pod3 and to-be-excluded pod4. Therefore, original pod3 and original pod4 are directly used as the to-be-excluded pods.

The network connection request in this embodiment of this application is created directly through an API interface or a kubectl command line. In addition, when legality verification is performed on the network connection request, legality verification is performed on formats of each selectable tag and each exclusion tag included in the network connection request.

The kubectl command line is configured for communicating with the API server, organizing and converting a command entered by the user on the command line into information that the API server supports identification, and then managing various k8s resources based on the kubectl command line.

Further, in this embodiment of this application, before the network connection is created, it is necessary to define the network connection object corresponding to the network connection. Specifically, in content of Spec of the network connection object, a desired network connection is defined in a declarative manner, and some information required for the extensible network connection is defined through ServiceLinkSource. A selector is defined. The selector defines some rows of selectable tags in the form of key-value pairs to select the selectable application instances intended to be connect to. An excluder is defined. The excluder is configured to exclude corresponding to-be-excluded application instances from a selectable application instance set selected by the Selector. These excluded to-be-excluded application instances may be selected in the form of exclusion tags and in the form of a list of to-be-excluded application instance identifiers.

In addition, when the network connection object is defined, a current running status of the network connection object is defined in a network status of the network connection object. The network status includes a to-be-excluded application instance set, a service-available application instance set, a service-not-available application instance set, and a probe-free application instance set. The to-be-excluded application instance set includes the excluded to-be-excluded application instances, the service-available application instance set includes each target application instance, the service-not-available application instance set includes candidate application instances other than each target application instance, and the probe-free application instance set includes application instances that are not configured with a probe.

In some embodiments, this embodiment of this application provides a possible implementation for selecting each candidate application instance. A process of determining each candidate application instance in this embodiment of this application is described below, which specifically includes the following processes.

Each candidate application instance includes: a container set that provides network services to the first service network and the second service network.

S21: The controller deletes a corresponding selectable application instance from each selectable application instance based on each selected to-be-excluded application instance, to obtain each candidate application instance associated with a first service network and a second service network.

In this embodiment of this application, a corresponding selectable application instance is deleted from each selectable application instance based on an application instance identifier corresponding to each selected to-be-excluded application instance, and each candidate application instance associated with a first service network and a second service network is obtained.

In this embodiment of this application, for each selected to-be-excluded application instance, the following operations are performed respectively: matching an application instance identifier corresponding to a to-be-excluded application instance with an application instance identifier corresponding to each selectable application instance, determining a selectable application instance having the same application instance identifier as each to-be-excluded application instance, deleting the determined selectable application instance from each selectable application instance, to obtain each candidate application instance associated with the first service network and the second service network. After each candidate application instance is obtained, each candidate application instance may be obtained from the API server through an informer mechanism of k8s.

In some embodiments, this embodiment of this application provides a possible implementation for obtaining each candidate application instance associated with the first service network and the second service network. A process of obtaining each candidate application instance in this embodiment of this application is described below, which specifically includes the following processes:

for each to-be-excluded application instance, performing, by the controller, the following operations respectively: based on a second application instance identifier corresponding to a to-be-excluded application instance, in a case that it is determined that the to-be-excluded application instance is included in each selectable application instance, deleting a selectable application instance corresponding to the second application instance identifier from each selectable application instance; and using, by the controller, each remaining selectable application instance as each candidate application instance.

In this embodiment of this application, an application instance identifier corresponding to a to-be-excluded application instance matches an application instance identifier corresponding to each selectable application instance, and it is determined whether a selectable application instance having the same application instance identifier as the to-be-excluded application instance can be matched. If it is determined that the selectable application instance having the same application instance identifier as the to-be-excluded application instance is determined from each selectable application instance, the determined selectable application instance is deleted from each selectable application instance. If the selectable application instance having the same application instance identifier as the to-be-excluded application instance is not determined from each selectable application instance, deletion processing is not performed on each selectable application instance.

Figure 2D:
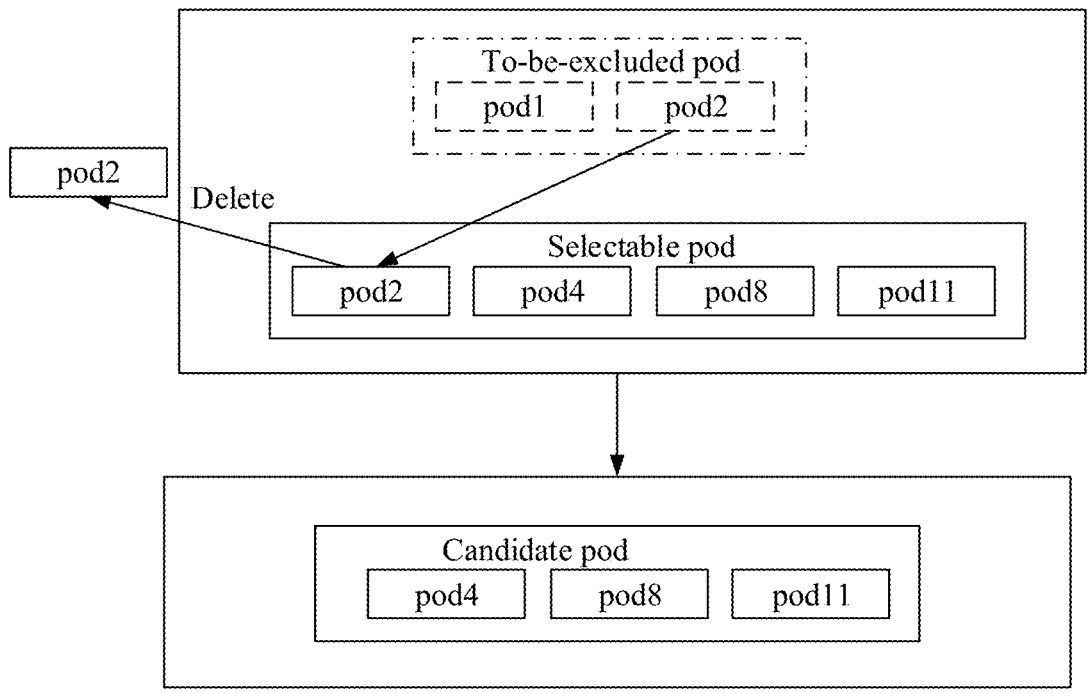
FIG. 2D is a schematic diagram showing deleting a candidate application instance according to an embodiment of this application.

For example, FIG. 2D is a schematic diagram showing deleting a selectable application instance according to an embodiment of this application. Assuming that an application instance is a pod, pod identifiers corresponding to to-be-excluded pods are pod1 and pod2 respectively, and pod identifiers corresponding to selectable pods are pod2, pod4, pod8, and pod11 respectively. Therefore, it is determined that a selectable pod having the same pod identifier as each to-be-excluded pod is the selectable pod2. Therefore, the selectable pod2 in each selectable pod is deleted, to obtained candidate pods associated with the first service network and the second service network are pod4, pod8, and pod11 respectively.

In some embodiments, this embodiment of this application further provides a possible implementation for obtaining each candidate application instance associated with the first service network and the second service network. A process of obtaining each candidate application instance in this embodiment of this application is described below, which specifically includes the following processes.

S211: The controller generates a to-be-excluded application instance set including each to-be-excluded application instance, and a selectable application instance set including each selectable application instance.

In this embodiment of this application, each to-be-excluded application instance is added to the to-be-excluded application instance set respectively, to obtain the to-be-excluded application instance set including each to-be-excluded application instance, and each selectable application instance is added to the selectable application instance set, to obtain the selectable application instance set including each selectable application instance.

S212: The controller deletes, based on an intersection between the to-be-excluded application instance set and the selectable application instance set, a to-be-excluded application instance included in the intersection from the selectable application instance set, to obtain a candidate application instance set including each candidate application instance by using each remaining selectable application instance as a candidate application instance.

In this embodiment of this application, the intersection between the to-be-excluded application instance set and the selectable application instance set is determined, then each to-be-excluded application instance can be excluded from each selectable application instance, the remaining selectable application instances are used as candidate application instances respectively, and a candidate application instance set including each candidate application instance is obtained.

S22: The controller selects, based on a running status corresponding to each candidate application instance, each target application instance that meets a preset running condition from each candidate application instance.

In this embodiment of this application, for each candidate application instance, the following operations are performed respectively: The controller determines whether a candidate application instance meets the preset running condition based on a running status corresponding to the candidate application instance. If it is determined that the candidate application instance meets the preset running condition, then the candidate application instance is used as a target application instance.

In some embodiments, this embodiment of this application provides a possible implementation for determining the target application instance from each candidate application instance. Specifically, each probe is obtained from the API server. Each candidate application instance may or may not be configured with a probe. If it is determined that a candidate application instance is configured with a probe, it is determined that a probe configuration status corresponding to the candidate application instance is configured. Therefore, it may be determined whether a candidate application instance is a target application instance may be determined according to a probe configuration status corresponding to the candidate application instance, which is described below in detail:

A first probe configuration status: configured.

Specifically, when it is determined that the probe configuration status corresponding to the candidate application instance is configured, it is determined whether the candidate application instance is used as the target application instance based on a probe detection result in the running status.

The probe detection result may be divided into the following three types: success, failure, and unknown. The probe detection results in this embodiment of this application are specifically described below.

A first probe detection result: success.

Specifically, when it is determined that a probe configuration status corresponding to a candidate application instance is configured and a corresponding probe detection result is success, the candidate application instance is used as a target application instance.

Each probe is configured to determine whether a corresponding candidate application instance is in a state of normally providing a network service.

In this embodiment of this application, when the candidate application instance is used as the target application instance, the following two conditions need to be met. A first condition is that the probe configuration status corresponding to the candidate application instance is configured, that is, the candidate application instance is configured with a probe. A second condition is that the probe detection result is success, that is, the candidate application instance is in a state of normally providing a network service. Therefore, when the probe configuration status corresponding to the candidate application instance is configured and the probe detection result is success, the candidate application instance is used as the target application instance.

Figure 2E:
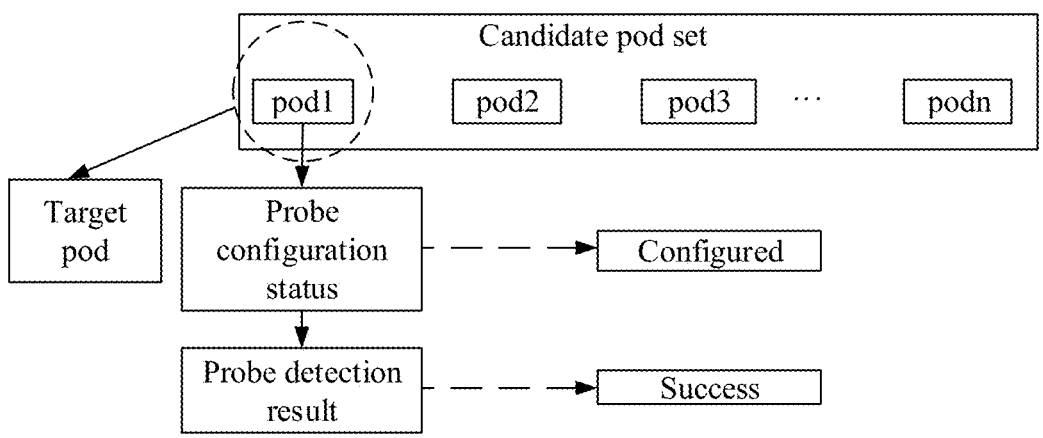
FIG. 2E is a schematic diagram showing determining a target application instance according to an embodiment of this application.

For example, FIG. 2E is a schematic diagram showing determining a target application instance according to an embodiment of this application. Assuming that an application instance is a pod. The controller reads candidate pod1 from a candidate pod set. If it is determined that a probe configuration status corresponding to candidate pod1 is configured, a probe detection result in a running status is read. In this case, the probe detection result is success, and it is determined that candidate pod1 is in a state of normally providing a network service. Therefore, candidate pod1 is used as a target pod, then a next candidate pod is read, and the process of determining whether the probe configuration status is configured is performed again.

A second probe detection result: failure.

Specifically, when it is determined that a probe configuration status corresponding to a candidate application instance is configured and a probe detection result in the running status is failure, no processing is performed on the candidate application instance.

In this embodiment of this application, when no processing is performed on the candidate application instance, the following two conditions need to be met. A first condition is that the probe configuration status corresponding to the candidate application instance is configured, that is, the candidate application instance is configured with a probe. A second condition is that the probe detection result is failure, that is, the candidate application instance is not in the state of normally providing a network service and cannot provide a network service. Therefore, when the probe configuration status corresponding to the candidate application instance is configured and the probe detection result is failure, no processing is performed on the candidate application instance.

Further, in this embodiment of this application, when it is determined that the probe detection result is failure, the candidate application instance is added to a service-not-available application instance set. Therefore, the service-not-available application instance set includes at least each service-not-available candidate application instance.

A third probe detection result: unknown.

Specifically, when it is determined that a probe configuration status corresponding to a candidate application instance is configured and a probe detection result in the running status is unknown, the process returns to no probe configuration.

In this embodiment of this application, if it is determined that the probe configuration status corresponding to the candidate application instance is configured, and the probe detection result in the running status is unknown, the candidate application instance is used as a candidate application instance that is not configured with a probe for corresponding processing, that is, it is determined whether the candidate application instance is used as the target application instance based on the running status of the application instance.

A second probe configuration status: unconfigured.

Specifically, when it is determined that a probe configuration status corresponding to the candidate application instance is unconfigured, it is determined whether the candidate application instance is used as a target application instance based on a running status of the application instance in the running status.

The running status of the application instance may be divided into the following two types: continuous running and not running normally. The running statuses of the application instance in this embodiment of this application are specifically described below.

A first running status of the application instance: continuous running.

Specifically, if it is determined that a probe configuration status is unconfigured and the running status of the application instance in the running status is continuous running, the candidate application instance is used as a target application instance.

In this embodiment of this application, when the candidate application instance is used as the target application instance, the following two conditions need to be met. A first condition is that the probe configuration status corresponding to the candidate application instance is unconfigured, that is, the candidate application instance is not configured with a probe. A second condition is that the running status of the application instance is continuous running, that is, the candidate application instance is running continuously. Therefore, when the probe configuration status corresponding to the candidate application instance is unconfigured and the running status of the application instance is continuous running, the candidate application instance is used as the target application instance.

For example, assuming that an application instance is a pod. The controller reads candidate pod3 from a candidate pod set. If it is determined that a probe configuration status corresponding to candidate pod3 is unconfigured, a running status of the pod in a running status is read. In this case, if it is determined that the running status of the pod is continuous running, it is determined that candidate pod3 is in a state of normally providing a network service. Therefore, candidate pod3 is used as a target pod, then a next candidate pod is read, and the process of determining whether the probe configuration status is configured is performed again.

A second running status of the application instance: not running normally.

Specifically, if it is determined that a probe configuration status is unconfigured and a running status of the application instance in the running status is not continuous running, no processing is performed on the candidate application instance.

In this embodiment of this application, when no processing is performed on the candidate application instance, the following two conditions need to be met. A first condition is that the probe configuration status corresponding to the candidate application instance is unconfigured, that is, the candidate application instance is not configured with a probe. A second condition is that the running status of the application instance is not running normally, that is, the candidate application instance is not in the state of normally providing a network service and cannot provide a network service. Therefore, when the probe configuration status corresponding to the candidate application instance is unconfigured and the running status of the application instance is not running normally, no processing is performed on the candidate application instance.

Not running normally indicates that the candidate application instance is in a status such as pending, initialization (init), error, or the like. This is not limited in the embodiments of this application.

In this way, through the foregoing method, each target application instance can be obtained, and each target application instance is an application instance that can provide a service normally, ensuring the reliability of the network connection.

Further, in this embodiment of this application, the controller may generate a probe-free application instance set, a service-available application instance set, and a service-not-available application instance set, specifically including:

A1: The controller adds each candidate application instance whose probe configuration status is unconfigured to a probe-free application instance set.

In this embodiment of this application, for each candidate application instance, the following operations are performed respectively: When it is determined that the probe configuration status corresponding to any candidate application instance is unconfigured, the candidate application instance is added to the probe-free application instance set.

A2: The controller adds each target application instance to a service-available application instance set.

In this embodiment of this application, each target application instance is added to the service-available application instance set respectively, so that each target application instance is included in the service-available application instance set.

A3: The controller adds each candidate application instance other than each target application instance to a service-not-available application instance set.

In this embodiment of this application, since the candidate application instances other than each target application instance are all candidate application instances that cannot normally provide a network service, each candidate application instance except each target application instance is added to the service-not-available application instance set.

A4: The controller stores the probe-free application instance set, the service-available application instance set, and the service-not-available application instance set into a network status.

In this embodiment of this application, the probe-free application instance set, the service-available application instance set, and the service-not-available application instance set are stored in a network status, so that each application instance set can be dynamically maintained, and the high availability of the network service is ensured.

S23: The controller establishes a network connection between the first service network and the second service network based on each target application instance.

In this embodiment of this application, a network connection is established between the first service network and the second service network based on each target application instance.

In some embodiments, in this embodiment of this application, a possible implementation is provided for establishing a network connection. A process of establishing a network connection in this embodiment of this application is described below, which specifically includes the following processes:

S231: The controller establishes a network interface between the first service network and the second service network by invoking a connection creation interface.

In this embodiment of this application, a network interface for providing a network service is established between the first service network and the second service network by invoking an external connection creation interface.

In S231, by invoking the connection creation interface, a network interface between the first service network and the second service network is created. Only through the network interface, the first service network cannot obtain the corresponding network service of the second service network, and the network service corresponding to the second service network needs to be provided to the first service network through each target application instance.

S232: The controller provides a network service of the second service network to the first service network by invoking each target application instance and the network interface.

In this embodiment of this application, since each target application instance is configured for providing the network service to the first service network, the network service corresponding to the second service network is provided to the first service network by invoking each target application instance and through the created network interface, thereby realizing the network connection, which can avoid a lot of repetitive work of the network connection in different network environments and reduce the resource consumption.

In this embodiment of this application, a real network service can be created through the target application instance. In addition, the network interface in this embodiment of this application is only configured to establish a network connection. The implementation logic of the network interface between various service networks may be the same. Certainly, a user can extend the network interface and inject a custom implementation logic. Therefore, the network interface is scalable.

Figure 2F:
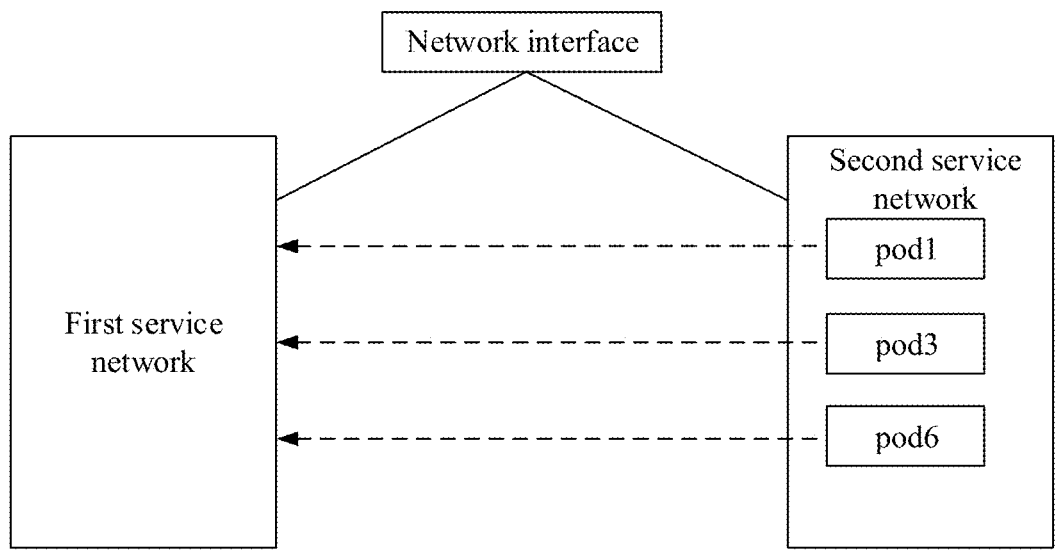
FIG. 2F is a schematic diagram showing providing a network service according to an embodiment of this application.

For example, FIG. 2F is a schematic diagram showing providing a network service according to an embodiment of this application. Assuming that an application instance is a pod. Between the first service network and the second service network, a network interface is created through the connection creation interface of the external service. Target pods are target pod1, target pod3, and target pod6 respectively. Target pod1, target pod3, and target pod6 provide the network service corresponding to the second service network to the first service network through the network interface.

In this embodiment of this application, the network service can be used declaratively, which greatly reduces the difficulty of business access to the network service and avoids a large amount of repeated access work between different businesses. Moreover, a good scalable architecture is provided, which can easily cope with different network environments and scenarios, and expand a corresponding network connection implementation. In addition, the high reliability of the service is supported and the running status of the application instance and the corresponding probe detection result are combined to ensure the high reliability of the network service.

Figure 3:
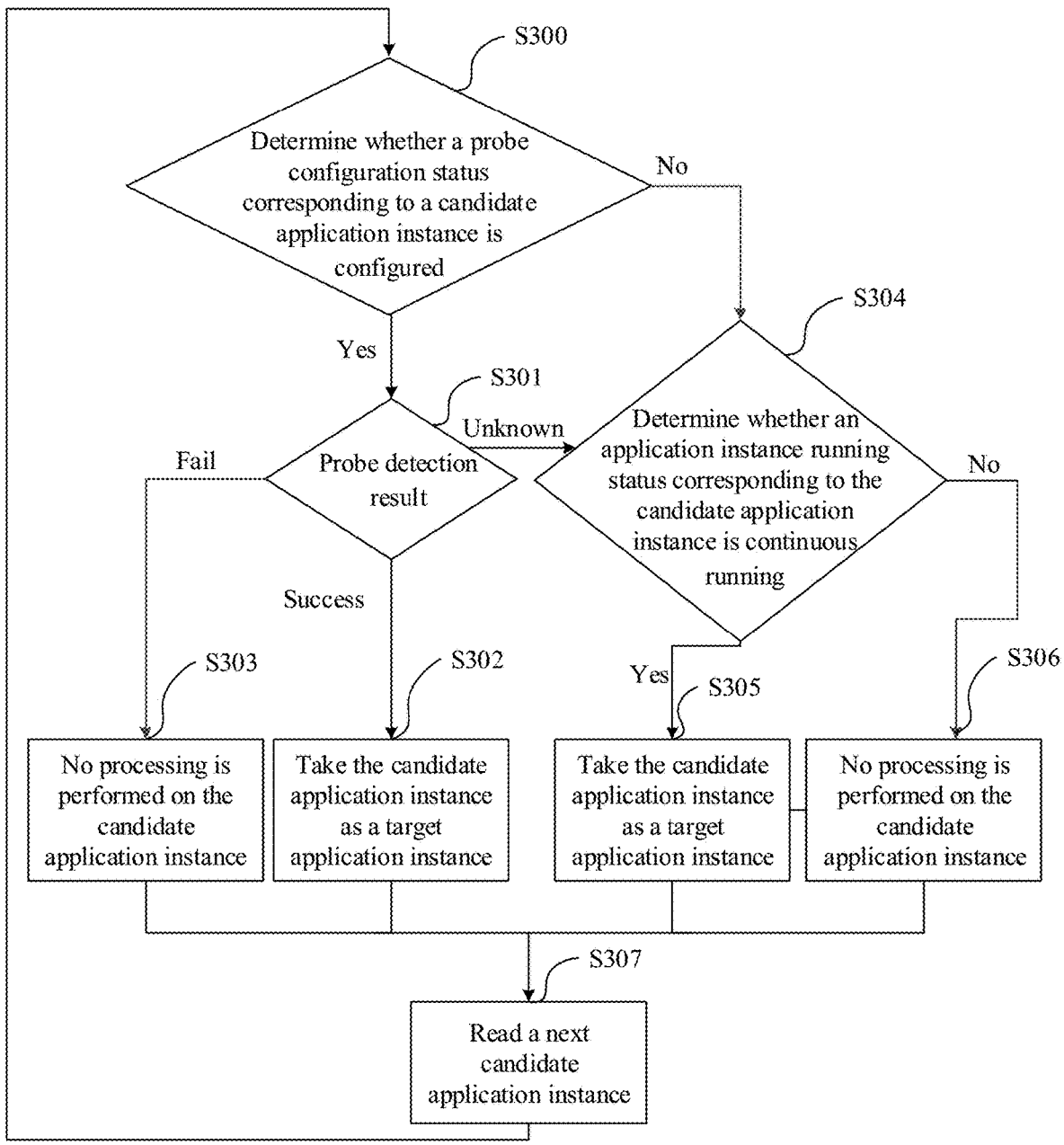
FIG. 3 is a schematic flowchart showing determining a target application instance according to an embodiment of this application.

Based on the foregoing embodiments, the following describes a process of determining a target application instance in this embodiment of this application. FIG. 3 is a schematic flowchart showing determining a target application instance according to an embodiment of this application, which specifically includes the following processes:

S300: Determine whether a probe configuration status corresponding to a candidate application instance is configured. If so, perform S301. If not, perform S304.

In this embodiment of this application, the running status corresponding to the candidate application instance includes a probe configuration status, and the probe configuration status includes configured and unconfigured.

S301: If a probe detection result is success, perform S302; if a probe detection result is failure, perform S303; and if a probe detection result is unknown, perform S304.

In this embodiment of this application, the running status corresponding to the candidate application instance further includes a probe detection result, and the probe detection result may be divided into success, failure, and unknown.

S302: Use the candidate application instance as a target application instance.

S303: No processing is performed on the candidate application instance.

S304: Determine whether an application instance running status corresponding to the candidate application instance is continuous running. If so, perform S305. If not, perform S306.

In this embodiment of this application, the running status corresponding to the candidate application instance further includes an application instance running status, and the application instance running status may be divided into continuous running and not running normally.

S305: Use the candidate application instance as a target application instance.

S306: No processing is performed on the candidate application instance.

S307: Read a next candidate application instance.

Therefore, through the foregoing method, the corresponding candidate application instance that can continuously provide a network service can be determined from each candidate application instance, thereby ensuring that when the target application instance is configured for providing the network service of the second service network for the first service network, the network service can be provided normally, and the normal network connection is ensured.

Figure 4:
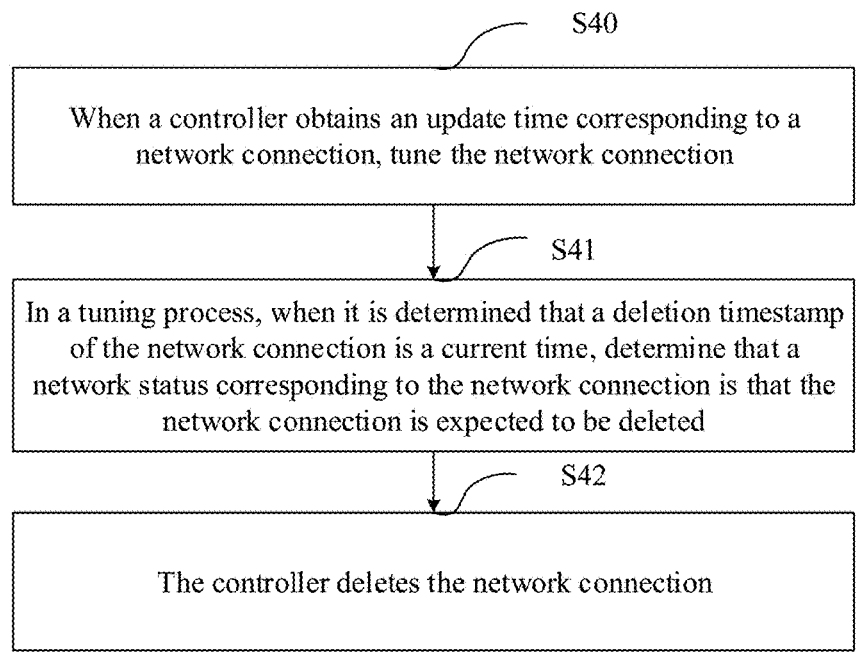
FIG. 4 is a schematic flowchart showing deleting a network connection according to an embodiment of this application.

Based on the foregoing embodiments, FIG. 4 is a schematic flowchart showing deleting a network connection according to an embodiment of this application, which specifically includes the following processes:

S40: When a controller obtains an update time corresponding to a network connection, tune the network connection.

The update time is generated by updating a network connection object after an API server sets a deletion timestamp for the network connection object to a current time in a case of receiving a deletion request for the network connection.

In this embodiment of this application, the user submits a deletion request for a network connection to the API server. The API server internally sets the deletion timestamp of the network connection object corresponding to the network connection to the current time, and updates the network connection object corresponding to the network connection. The network connection is tuned when the controller obtains the update time of the network connection object of the network connection in the API server.

For example, assuming that the time of the deletion request submitted by the user is 2:10:00, the deletion timestamp of the network connection is set to 2:10:00. In this case, the network connection object corresponding to the network connection is updated. The controller determines that the network connection object is updated, and then the network connection is tuned.

When the API server sets the deletion timestamp, the network connection object is prevented from being deleted by its own deletion interception identifier.

In addition, in this embodiment of this application, the network connection is tuned to represent the deletion process of the network connection. However, in the deletion process, there may be a situation in which the deletion process cannot be performed. Therefore, in this case, the deletion process is terminated.

S41: In a tuning process, if it is determined that a deletion timestamp of the network connection is a current time, the controller determines that a network status corresponding to the network connection is that the network connection is expected to be deleted.

The deletion timestamp is set when the deletion request is received.

In this embodiment of this application, in a tuning process, if it is determined that a deletion timestamp is not empty, that is, the determined deletion timestamp of the network connection is the current time, it is determined that the network status corresponding to the network connection is that the network connection is expected to be deleted.

For example, assuming that the time of the deletion request submitted by the user is 2:10:00, the deletion timestamp of the network connection is set to 2:10:00. In the tuning process, it is determined that the deletion timestamp corresponding to the network connection is not empty and is 2:10:00, it is determined that the network connection is expected to be deleted.

In this embodiment of this application, when the network status is that the network connection is expected to be deleted, it indicates that the network connection is expected to be deleted.

S42: The controller deletes the network connection.

In this embodiment of this application, when it is determined that the network status corresponding to the network connection is that the network connection is expected to be deleted, the network connection is deleted.

In some embodiments, in this embodiment of this application, a possible implementation is provided for a controller to delete a network connection. A process of deleting a network connection in this embodiment of this application is described below, which specifically includes the following processes:

S421: The controller deletes each network service interface corresponding to the network connection by invoking a deletion network interface.

In this embodiment of this application, by invoking the external deletion network interface, each existing network service interface of the network connection is deleted, so that the underlying network connection is deleted.

When each network service interface is deleted, the user's own logic can be injected and implemented, which improves the scalability of deleting a network connection.

S422: The controller removes a deletion interception identifier corresponding to the network connection and generates a deletion instruction.

In this embodiment of this application, after the underlying network connection is successfully deleted, the deletion interception identifier corresponding to the network connection is removed and the deletion instruction is generated.

S423: The controller transmits the deletion instruction to an API server, to enable the API server to delete a created network connection object corresponding to the network connection.

In this embodiment of this application, after it is determined that the deletion interception identifier corresponding to the network connection is removed, a deletion instruction is generated, and the generated deletion instruction is transmitted to the API server. The API server deletes the network connection object created by the network connection in response to the deletion instruction.

In this way, through the foregoing method, the network connection can be deleted, further ensuring that the network connection can be completely deleted.

Figure 5:
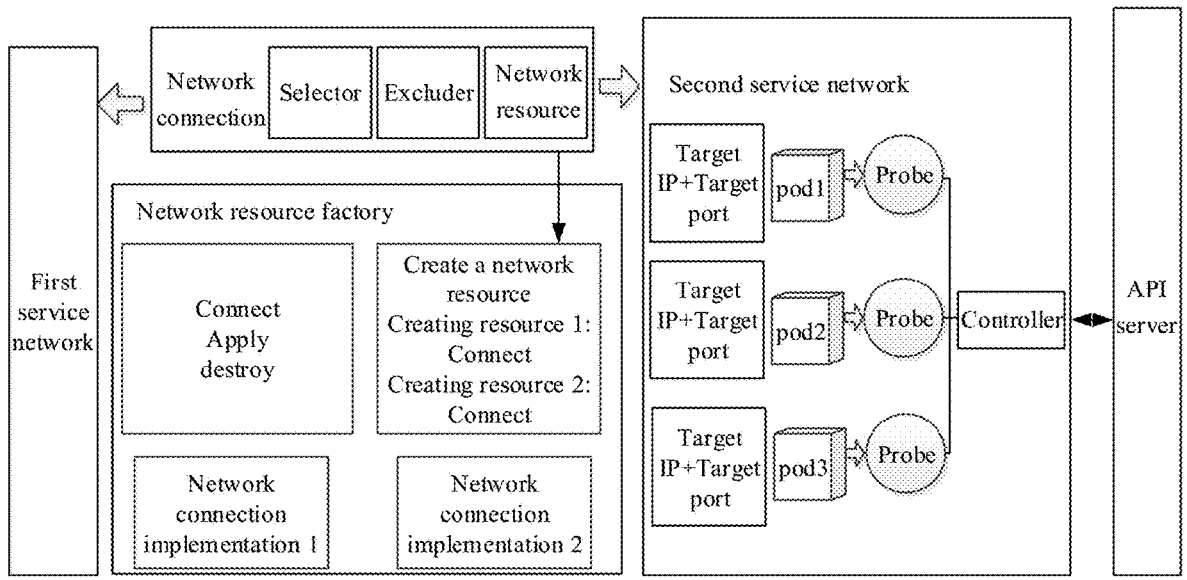
FIG. 5 is a schematic diagram of a system according to an embodiment of this application.

Based on the foregoing embodiments, FIG. 5 is a schematic diagram of a system according to an embodiment of this application, which specifically includes:

1. First Service Network.

In this embodiment of this application, after the first service network establishes a network connection with the second service network, the first service network may use the service provided by the second service network.

2. Second Service Network.

In this embodiment of this application, the second service network is configured to provide a service to the first service network. The first service network and the second service network are located in different network environments, and the first service network and the second service network are isolated from each other.

The second service network includes pod1, pod2, and pod3, and pod1, pod2, and pod3 are each configured with a probe.

3. Selector.

In this embodiment of this application, the selector is configured to select the selectable application instance corresponding to the corresponding selectable tag from the preset original application instance based on each selectable tag included in the selection indication information.

4. Excluder.

In this embodiment of this application, the excluder is configured to select the to-be-excluded application instance corresponding to the corresponding exclusion tag from the preset original application instance based on each exclusion tag included in the exclusion indication information.

5. Network Resource.

In this embodiment of this application, the network resource is a module that can be implemented by personalized expansion and is configured for realizing reentrant creation and deletion of a network connection.

6. Network Resource Factory.

In this embodiment of this application, the network resource factory is configured for establishing the corresponding network connection in a factory mode and delete the network connection, including a creating resource 1 and a creating resource 2. Both the creating resource 1 and the creating resource 2 are configured for establishing a network connection.

The network resource factory in this embodiment of this application is a module that can be customized and extended. It only needs to implement the Apply and Destroy methods to achieve reentrant creation and deletion of a network connection. In this way, it only needs to create a network connection object declaratively subsequently to easily implement a network connection request.

Apply is a method to create a network connection, and Destroy is a method to delete a network connection.

7. Controller.

In this embodiment of this application, the controller is configured to interact with the API server and create or delete a network connection.

8. API server.

In this embodiment of this application, the API server is configured to receive a network connection request and a deletion network connection request, and transmit the received network connection request and the deletion network connection request to the controller for a network connection or deletion of a network connection.

Figure 6:
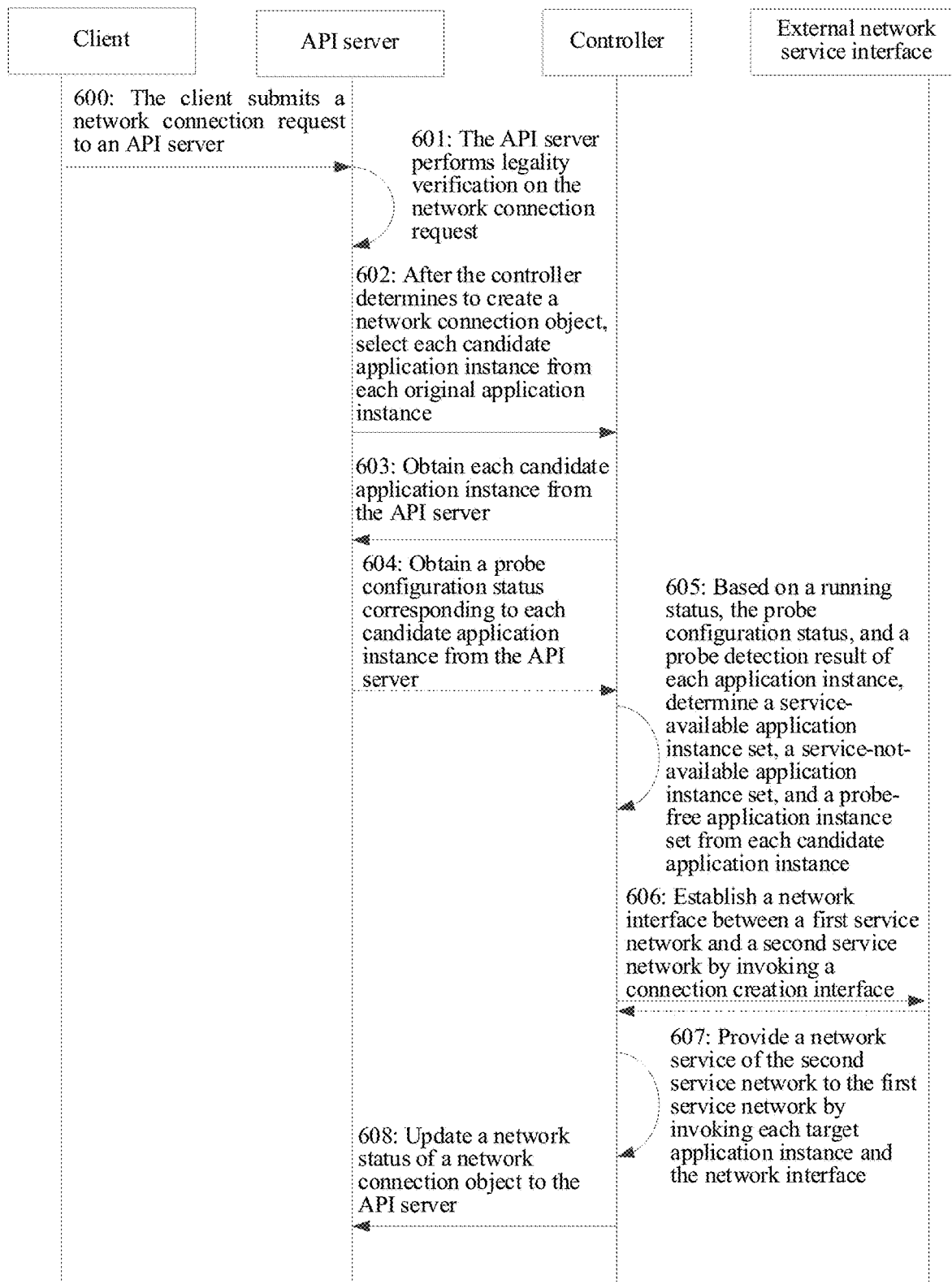
FIG. 6 is an interaction flowchart showing establishing a network connection according to an embodiment of this application.

Based on the foregoing embodiments, FIG. 6 is an interaction flowchart of establishing a network connection according to an embodiment of this application, which specifically includes the following processes:

Process 600: A client submits a network connection request to an API server.

Process 601: The API server performs legality verification on the network connection request.

In this embodiment of this application, the API server performs legality verification on the network connection request. After it is determined that the network connection request passes the legality verification, it is determined that the creation of the network connection object is allowed.

Process 602: After a controller determines to create a network connection object, select each candidate application instance from each original application instance.

In this embodiment of this application, each selectable application instance corresponding to each selectable tag can be determined through the selector in k8s, and through the excluder in k8s, each to-be-excluded application instance corresponding to each exclusion tag can be determined, and the matched to-be-excluded application instance is deleted from each selectable application instance, thereby obtaining each candidate application instance.

Each selectable tag in this embodiment of this application can be specified in a configuration list when the pod is created, or can be added using an instruction after the pod is created. A pod can correspond to a plurality of selectable tags. In addition, a selectable tag can also be attached to a plurality of pods.

The application instance in this embodiment of this application may be a pod. This is not limited in this embodiment of this application.

Process 603: Obtain each candidate application instance from the API server.

In this embodiment of this application, each candidate application instance may be obtained from the API server through an informer mechanism of k8s.

Informer is a code abstraction of resources, runs under a driver of the controller, pops data in Delta FIFO, and then transmits the data to Indexer. In addition, Informer may also distribute the data to a custom controller for event processing.

Process 604: Obtain a probe configuration status corresponding to each candidate application instance from the API server.

Process 605: Based on a running status, the probe configuration status, and a probe detection result of each application instance, determine a service-available application instance set, a service-not-available application instance set, and a probe-free application instance set from each candidate application instance.

Process 606: Establish a network interface between a first service network and a second service network by invoking a connection creation interface.

Process 607: Provide a network service of the second service network to the first service network by invoking each target application instance and the network interface.

Process 608: Update a network status of a network connection object to the API server.

Figure 7:
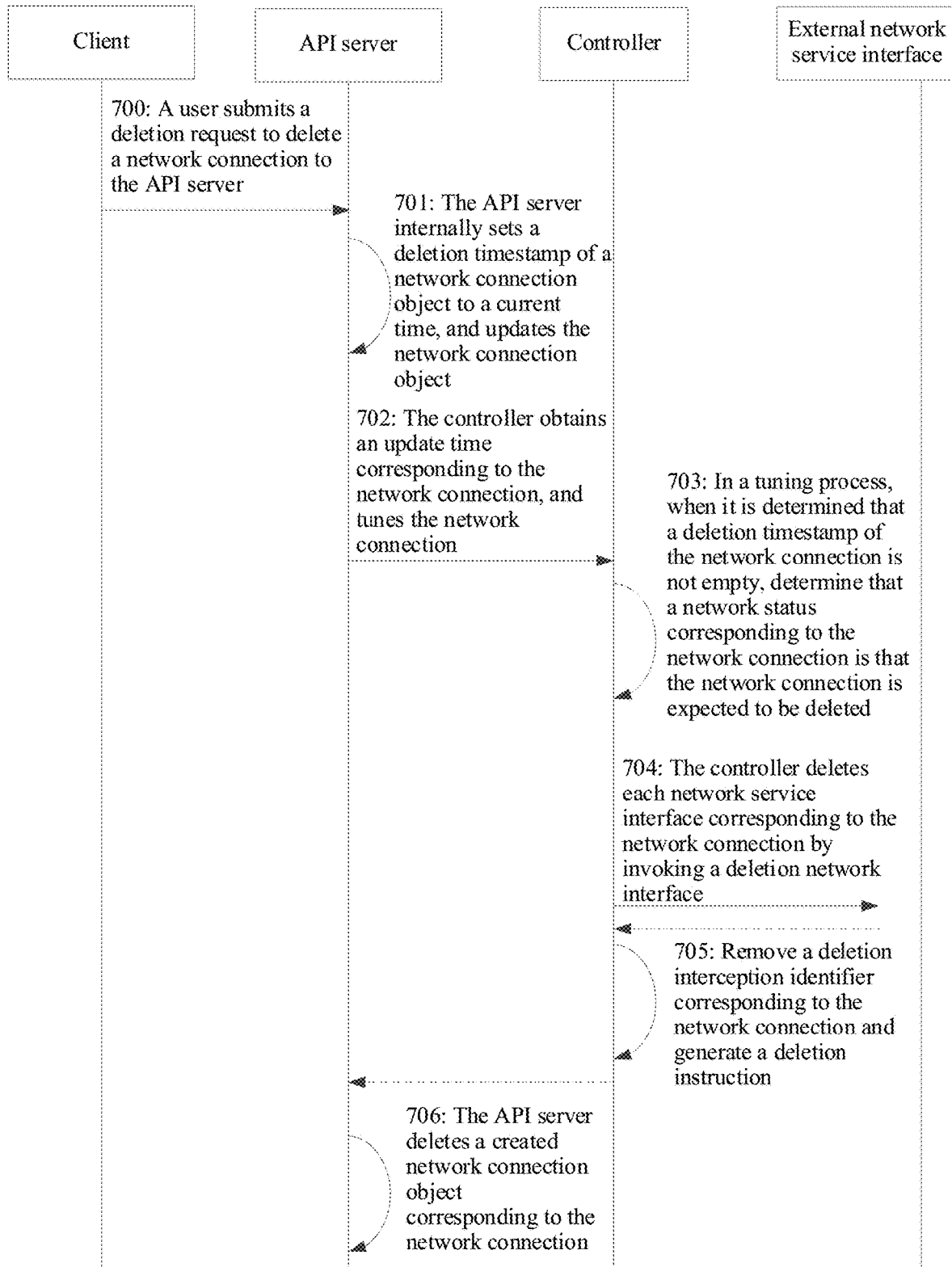
FIG. 7 is an interaction flowchart showing deleting a network connection according to an embodiment of this application.

Based on the foregoing embodiments, FIG. 7 is an interaction flowchart of deleting a network connection according to an embodiment of this application, which specifically includes the following processes:

Process 700: A user submits a deletion request to delete a network connection to an API server.

Process 701: The API server internally sets a deletion timestamp of a network connection object to a current time, and updates the network connection object.

In this embodiment of this application, after the network connection object is updated, the network connection object is prevented from being deleted by its own deletion prevention identifier.

The deletion prevention identifier in this embodiment of this application may be a Finalizers field in k8s. The Finalizers field belongs to a Kubernetes GC garbage collector and is a deletion interception mechanism that allows the controller to implement asynchronous pre-delete callbacks. The Finalizers field can exist in each network connection object. In a specific implementation, a deletion request for a network connection object with a Finalizer field sets its deletion timestamp to the current time, but the network connection object is not deleted in this process, and once the deletion timestamp is set, a value in the Finalizers field is removed.

When the field corresponding to the deletion timestamp is set, each controller responsible for monitoring the network connection object performs all the prevention deletion mechanisms to be processed by polling update requests for the network connection object. When all prevention deletion mechanisms are executed, the network connection object is deleted.

Process 702: A controller obtains an update time corresponding to the network connection and tunes the network connection.

Process 703: In a tuning process, when it is determined that a deletion timestamp of the network connection is not empty, determine that a network status corresponding to the network connection is that the network connection is expected to be deleted.

Process 704: The controller deletes each network service interface corresponding to the network connection by invoking a deletion network interface.

In this embodiment of this application, when each network service interface corresponding to the network connection is deleted by invoking the deletion network interface, it can be implemented through a default deletion execution logic. Certainly, custom logic implementation can also be injected and implemented. Therefore, it has the scalability.

Process 705: Remove a deletion interception identifier corresponding to the network connection and generate a deletion instruction.

In this embodiment of this application, the controller removes the Finalizer of the network connection object and updates the network connection object to the API server.

Process 706: The API server deletes a created network connection object corresponding to the network connection.

Figure 8:
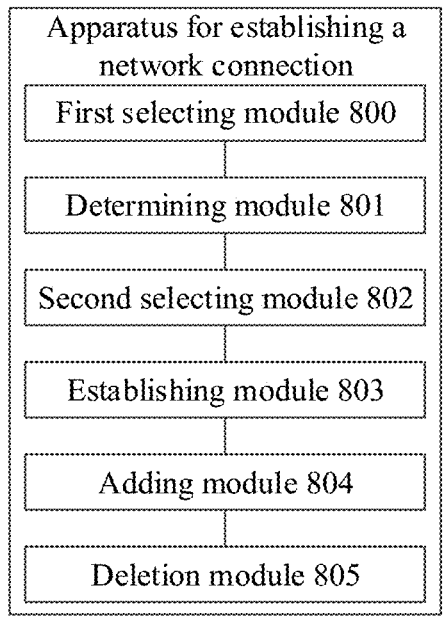
FIG. 8 is a schematic structural diagram of an apparatus for establishing a network connection according to an embodiment of this application.

Based on the same invention concept, an embodiment of this application further provides an apparatus for establishing a network connection. FIG. 8 is a schematic structural diagram of an apparatus for establishing a network connection according to an embodiment of this application and includes:

- a first selecting module 800, configured to select, based on each selectable tag carried by a created network connection object, a selectable application instance corresponding to each selectable tag from each preset original application instance, and select each to-be-excluded application instance from each original application instance based on exclusion indication information carried by the network connection object;
- a determining module 801, configured to delete a corresponding selectable application instance from each selectable application instance based on each selected to-be-excluded application instance, to obtain each candidate application instance associated with a first service network and a second service network;
- a second selecting module 802, configured to select, based on a running status corresponding to each candidate application instance, each target application instance that meets a preset running condition from each candidate application instance; and
- an establishing module 803, configured to establish a network connection between the first service network and the second service network based on each target application instance.

In some embodiments, in a case of selecting each to-be-excluded application instance from each original application instance based on exclusion indication information carried by the network connection object, the first selecting module 800 is further configured to:

- select, based on each exclusion tag included in the exclusion indication information, a to-be-excluded application instance corresponding to each exclusion tag from each original application instance; and
- determine, based on each first application instance identifier included in the exclusion indication information, a to-be-excluded application instance corresponding to a corresponding first application instance identifier from each original application instance.

In some embodiments, the determining module 801 is further configured to:

for each to-be-excluded application instance, perform the following operations respectively: based on a second application instance identifier corresponding to a to-be-excluded application instance, in a case that it is determined that the to-be-excluded application instance is included in each selectable application instance, deleting a selectable application instance corresponding to the second application instance identifier from each selectable application instance; and
using each remaining selectable application instance as each candidate application instance.

In some embodiments, in a case of deleting a corresponding selectable application instance from each selectable application instance based on each selected to-be-excluded application instance, to obtain each candidate application instance associated with a first service network and a second service network, the determining module 801 is further configured to:

- generate a to-be-excluded application instance set including each to-be-excluded application instance, and a selectable application instance set including each selectable application instance; and
- delete, based on an intersection between the to-be-excluded application instance set and the selectable application instance set, a to-be-excluded application instance included in the intersection from the selectable application instance set, to obtain a candidate application instance set including each candidate application instance by using each remaining selectable application instance as a candidate application instance.

In some embodiments, the running status at least includes a probe configuration status, and the second selecting module 802 is further configured to:

for each candidate application instance, perform the following operations respectively:
- in a case that it is determined that a probe configuration status corresponding to a candidate application instance is configured and detection of a corresponding configured probe succeeds, using the candidate application instance as a target application instance, where each probe is configured to determine whether a corresponding candidate application instance is in a state of normally providing a network service; and
- in a case that it is determined that the probe configuration status is unconfigured and an application instance running status in the running status is continuous running, using the candidate application instance as the target application instance.

In some embodiments, the apparatus further includes an adding module 804, and the adding module 804 is configured to:

- add each candidate application instance whose probe configuration status is unconfigured to a probe-free application instance set;
- add each target application instance to a service-available application instance set;
- add each candidate application instance other than each target application instance to a service-not-available application instance set; and
- store the probe-free application instance set, the service-available application instance set, and the service-not-available application instance set into a network status.

In some embodiments, the establishing module 803 is further configured to:

- establish a network interface between the first service network and the second service network by invoking a connection creation interface; and
- provide a network service of the second service network to the first service network by invoking each target application instance and the network interface.

In some embodiments, the apparatus further includes a deletion module 805, and the deletion module 805 is configured to:

in a case of obtaining an update time corresponding to the network connection, tune the network connection, where the update time is generated by updating a network connection object after an API server sets a deletion timestamp for the network connection object to a current time in a case of receiving a deletion request for the network connection;

in a tuning process, in a case that it is determined that the deletion timestamp of the network connection is the current time, determine that the network status corresponding to the network connection is that the network connection is expected to be deleted, where the deletion timestamp is set when the deletion request is received; and delete the network connection.

In some embodiments, when the network connection is deleted, the deletion module 805 is further configured to:

delete each network service interface corresponding to the network connection by invoking a deletion network interface;

remove a deletion interception identifier corresponding to the network connection and generate a deletion instruction;

transmit the deletion instruction to an API server, to enable the API server to delete a created network connection object corresponding to the network connection.

In some possible implementations, the apparatus for establishing a network connection according to this application may at least include a processor and a memory. The memory stores program code, and the program code, when executed by the processor, causes the processor to perform processes of the method for establishing a network connection described in the specification according to various exemplary embodiments of this application. For example, the processor may perform the processes shown in FIG. 2A

Figure 9:
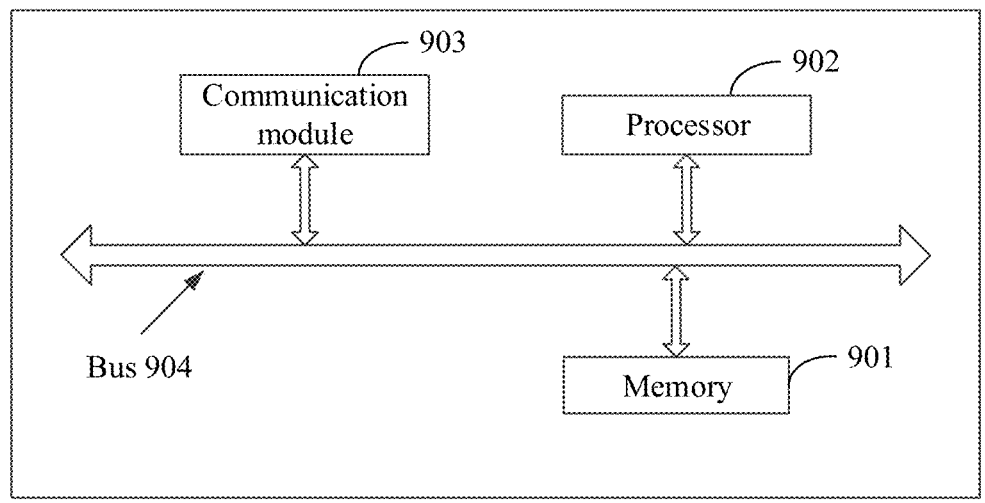
FIG. 9 is a schematic structural diagram showing a hardware composition of an electronic device that applies an embodiment of this application.

Based on the same invention concept as the foregoing method embodiments, an embodiment of this application further provides an electronic device. In an embodiment, the electronic device may be the controller 110 as shown in FIG. 1. In this embodiment, a structure of the electronic device may be as shown in FIG. 9, including a memory 901, a communication module 903, and one or more processors 902.

The memory 901 is configured to store a computer program executed by the processor 902. The memory 901 may mainly include a program storage area and a data storage area. The program storage area may store an operating system and a program required to run an instant messaging function. The storage data area may store various instant messaging information and an operation instruction set.

The memory 901 may be a volatile memory such as a random-access memory (RAM). The memory 901 may also be a non-volatile memory such as a read-only memory, a flash memory, a hard disk drive (HDD), or a solid-state drive (SSD). Alternatively, the memory 901 is any other medium that can be configured to carry or store expected program code that has an instruction or data structure form, and that can be accessed by a computer, but is not limited thereto. The memory 501 may be a combination of the foregoing memories.

The processor 902 may include one or more central processing units (CPU), or may be a digital processing unit.

The processor 902 is configured to implement the foregoing method for establishing a network connection when the computer program stored in the memory 901 is invoked.

The communication module 903 is configured to communicate with a terminal device and other servers.

In this embodiment of this application, a specific connection medium between the memory 901, the communication module 903, and the processor 902 is not limited. In this embodiment of this application, in FIG. 9, the memory 901 and the processor 902 are connected to each other through a bus 904. The bus 904 is represented by using a bold line in FIG. 9. A manner of connection between other components is only schematically described, but is not used as a limitation. The bus 904 may be classified into an address bus, a data bus, a control bus, and the like. For case of description, the bus in FIG. 9 is represented by using only one bold line, but which does not indicate that there is only one bus or one type of bus.

The memory 901 stores a computer storage medium, the computer storage medium stores computer executable instructions, and the computer executable instructions are configured for implementing the method for establishing a network connection according to the embodiments of this application. The processor 902 is configured to execute the foregoing method for establishing a network connection, as shown in FIG. 2A.

In some possible implementations, each aspect of the method for establishing a network connection provided in this application may be further implemented in a form of a program product including program code. When the program product is run on a computer device, the program code is configured for enabling the computer device to perform processes of the method according to the various exemplary implementations of this application described above in the specification. For example, the computer device can perform the processes shown in FIG. 2A.

The program product may use any combination of one or more readable media. The readable medium may be a readable signal medium or a readable storage medium. The readable storage medium may be, for example, but not limited to, an electric, magnetic, optical, electromagnetic, infrared, or semi-conductive system, apparatus, or device, or any combination thereof. More specific examples (non-exhaustive list) of the readable storage medium include: an electrical connection having one or more wires, a portable disk, a hard disk, a random access memory (RAM), a read-only memory (ROM), an erasable programmable read only memory (EPROM or a flash memory), an optical fiber, a portable compact disk read-only memory (CD-ROM), an optical storage device, a magnetic storage device, or any suitable combination thereof.

The program product according to an implementation of this application may use a CD-ROM, include program code, and may be run on a computing apparatus. However, the program product of this application is not limited thereto. In this file, the readable storage medium may be any tangible medium including or storing a program, and the program may be used by or in combination with an instruction execution system, apparatus, or device.

The readable signal medium may include a data signal propagated in a baseband or as part of a carrier, and stores computer-readable program code. A data signal propagated in such a way may assume a plurality of forms, including, but not limited to, an electromagnetic signal, an optical signal, or any appropriate combination thereof. The readable signal medium may alternatively be any readable medium other than the readable storage medium. The readable medium may be configured to transmit, propagate, or transmit a program configured to be used by or in combination with an instruction execution system, apparatus, or device.

The program code included in the readable medium may be transmitted by using any suitable medium, including but not limited to, wireless transmission, a wire, a cable, radio frequency (RF) or the like, or any suitable combination of thereof.

The program code for executing the operations of this application may be written by using any combination of one or more programming languages. The programming languages include an object-oriented programming language such as Java and C++, and also include a conventional procedural programming language such as "C" or similar programming languages. The program code may be completely executed on a user computing apparatus, partially executed on user equipment, executed as an independent software package, partially executed on a user computing apparatus and partially executed on a remote computing apparatus, or completely executed on a remote computing apparatus or server. For the case involving a remote computing apparatus, the remote computing apparatus may be connected to a user computing apparatus through any type of network including a local area network (LAN) or a wide area network (WAN), or may be connected to an external computing apparatus (for example, through the Internet by using an Internet service provider).

What is claimed is:

1. A network connection establishing method comprising:
   selecting, by a controller based on one or more selectable tags carried by a network connection object, one or more selectable application instances corresponding to the one or more selectable tags, respectively, from one or more original application instances;
   selecting, by the controller, one or more excludable application instances from the one or more original application instances based on exclusion indication information carried by the network connection object;
   deleting, by the controller, one or more of the one or more selectable application instances based on the one or more excludable application instances, to obtain one or more candidate application instances associated with a first service network and a second service network;
   selecting, by the controller based on a running status corresponding to each of the one or more candidate application instances, one or more target application instances that meet a running condition, from the one or more candidate application instances; and
   establishing, by the controller, a network connection between the first service network and the second service network based on the one or more target application instances, comprising:
      establishing, by the controller, a network interface between the first service network and the second service network by invoking a connection creation interface; and
      providing, by the controller, a network service of the second service network to the first service network by invoking the one or more target application instances and the network interface.

2. The method according to claim 1, wherein selecting, by the controller, the one or more excludable application instance from the one or more original application instances based on the exclusion indication information carried by the network connection object includes:
   selecting, by the controller based on one or more exclusion tags in the exclusion indication information, one or more excludable application instances corresponding to the one or more exclusion tags, from the one or more original application instances; and
   determining, by the controller based on one or more application instance identifiers in the exclusion indication information, one or more excludable application instances corresponding to the one or more application instance identifiers, from the one or more original application instances.

3. The method according to claim 1, wherein deleting, by the controller, the one or more of the one or more selectable application instances based on the one or more excludable application instances, to obtain the one or more candidate application instances associated with the first service network and the second service network includes:
   for each excludable application instance, by the controller:
      in response to determining, based on an application instance identifier corresponding to the excludable application instance, that the excludable application instance is one of the one or more selectable application instances, deleting one of the one or more selectable application instances that corresponds to the application instance identifier; and
   determining, by the controller, one or more remaining selectable application instances as the one or more candidate application instances.

4. The method according to claim 1, wherein deleting, by the controller, the one or more of the one or more selectable application instances based on the one or more excludable application instances, to obtain the one or more candidate application instances associated with the first service network and the second service network includes:
   generating, by the controller, an excludable application instance set including the one or more excludable application instances, and a selectable application instance set including the one or more selectable application instances; and
   deleting, by the controller based on an intersection between the excludable application instance set and the selectable application instance set, one or more excludable application instance in the intersection from the selectable application instance set, to obtain a candidate application instance set including the one or more candidate application instances by using each remaining selectable application instance as a candidate application instance.

5. The method according to claim 1, wherein the running status includes a probe configuration status, and selecting, by the controller based on the running status corresponding to each of the one or more candidate application instances, the one or more target application instances that meet the running condition, from the one or more candidate application instances includes, for each candidate application instance, by the controller:
   in response to determining that the probe configuration status corresponding to the candidate application instance is configured and detection of a corresponding con figured probe succeeds, determining the candidate application instance as a target application instance, each probe being configured to determine whether a corresponding candidate application instance is in a state of normally providing a network service; and
   in response to determining that the probe configuration status is unconfigured and an application instance running status in the running status is continuous running, determining the candidate application instance as the target application instance.

6. The method according to claim 1, further comprising:
adding, by the controller, each candidate application instance with probe configuration status being unconfigured to a probe-free application instance set;
adding, by the controller, the one or more target application instances to a service-available application instance set;
adding, by the controller, each candidate application instance that is not one of the one or more target application instances to a service-not-available application instance set; and
storing, by the controller, the probe-free application instance set, the service-available application instance set, and the service-not-available application instance set into a network status.

7. The method according to claim 1, further comprising:
tuning, by the controller, the network connection in response to obtaining an update time corresponding to the network connection, the update time being generated by an API server by updating a network connection object after setting a deletion timestamp for the network connection object to a current time in response to receiving a deletion request for the network connection;
during a process of tuning the network connection, in response to determining that the deletion timestamp is the current time, determining, by the controller, that the network status corresponding to the network connection is that the network connection is expected to be deleted, the deletion timestamp being set in response to receiving the deletion request; and
deleting, by the controller, the network connection.

8. The method according to claim 7, wherein deleting, by the controller, the network connection includes:
deleting, by the controller, one or more network service interfaces corresponding to the network connection by invoking a deletion network interface;
removing, by the controller, a deletion interception identifier corresponding to the network connection and generating a deletion instruction; and
transmitting, by the controller, the deletion instruction to the API server, to enable the API server to delete the network connection object corresponding to the network connection.

9. An electronic device comprising:
one or more processors; and
one or more memories storing one or more program codes that, when executed by the one or more processors, cause the one or more processors to:
select, based on one or more selectable tags carried by a network connection object, one or more selectable application instances corresponding to the one or more selectable tags, respectively, from one or more original application instances;
select one or more excludable application instances from the one or more original application instances based on exclusion indication information carried by the network connection object;
delete one or more of the one or more selectable application instances based on the one or more excludable application instances, to obtain one or more candidate application instances associated with a first service network and a second service network;
select, based on a running status corresponding to each of the one or more candidate application instances, one or more target application instances that meet a running condition, from the one or more candidate application instances; and
establish a network connection between the first service network and the second service network based on the one or more target application instances, comprising:
establishing a network interface between the first service network and the second service network by invoking a connection creation interface; and
providing a network service of the second service network to the first service network by invoking the one or more target application instances and the network interface.

10. The electronic device according to claim 9, wherein the one or more program codes further cause the one or more processors to:
select, based on one or more exclusion tags in the exclusion indication information, one or more excludable application instances corresponding to the one or more exclusion tags, from the one or more original application instances; and
determine, based on one or more application instance identifiers in the exclusion indication information, one or more excludable application instances corresponding to the one or more application instance identifiers, from the one or more original application instances.

11. The electronic device according to claim 9, wherein the one or more program codes further cause the one or more processors to:
for each excludable application instance:
in response to determining, based on an application instance identifier corresponding to the excludable application instance, that the excludable application instance is one of the one or more selectable application instances, delete one of the one or more selectable application instances that corresponds to the application instance identifier; and
determine one or more remaining selectable application instances as the one or more candidate application instances.

12. The electronic device according to claim 9, wherein the one or more program codes further cause the one or more processors to:
generate an excludable application instance set including the one or more excludable application instances, and a selectable application instance set including the one or more selectable application instances; and
delete, based on an intersection between the excludable application instance set and the selectable application instance set, one or more excludable application instance in the intersection from the selectable application instance set, to obtain a candidate application instance set including the one or more candidate application instances by using each remaining selectable application instance as a candidate application instance.

13. The electronic device according to claim 9, wherein the one or more program codes further cause the one or more processors to, for each candidate application instance:
in response to determining that the probe configuration status corresponding to the candidate application instance is configured and detection of a corresponding configured probe succeeds, determine the candidate application instance as a target application instance, each probe being configured to determine whether a corresponding candidate application instance is in a state of normally providing a network service; and in response to determining that the probe configuration status is unconfigured and an application instance running status in the running status is continuous running, determine the candidate application instance as the target application instance.

14. The electronic device according to claim 9, wherein the one or more program codes further cause the one or more processors to:

add each candidate application instance with probe configuration status being unconfigured to a probe-free application instance set;

add the one or more target application instances to a service-available application instance set;

add each candidate application instance that is not one of the one or more target application instances to a service-not-available application instance set; and store the probe-free application instance set, the service-available application instance set, and the service-not-available application instance set into a network status.

15. The electronic device according to claim 9, wherein the one or more program codes further cause the one or more processors to:

tune the network connection in response to obtaining an update time corresponding to the network connection, the update time being generated by an API server by updating a network connection object after setting a deletion timestamp for the network connection object to a current time in response to receiving a deletion request for the network connection;

during a process of tuning the network connection, in response to determining that the deletion timestamp is the current time, determine that the network status corresponding to the network connection is that the network connection is expected to be deleted, the deletion timestamp being set in response to receiving the deletion request; and delete the network connection.

16. The electronic device according to claim 15, wherein the one or more program codes further cause the one or more processors to:

delete one or more network service interfaces corresponding to the network connection by invoking a deletion network interface;

remove a deletion interception identifier corresponding to the network connection and generating a deletion instruction; and transmit the deletion instruction to the API server, to enable the API server to delete the network connection object corresponding to the network connection.

17. A non-transitory computer-readable storage medium storing one or more program codes that, when executed by one or more processors, cause the one or more processors to:

select, based on one or more selectable tags carried by a network connection object, one or more selectable application instances corresponding to the one or more selectable tags, respectively, from one or more original application instances;

select one or more excludable application instances from the one or more original application instances based on exclusion indication information carried by the network connection object;

delete one or more of the one or more selectable application instances based on the one or more excludable application instances, to obtain one or more candidate application instances associated with a first service network and a second service network;

select, based on a running status corresponding to each of the one or more candidate application instances, one or more target application instances that meet a running condition, from the one or more candidate application instances; and establish a network connection between the first service network and the second service network based on the one or more target application instances, comprising:

establishing a network interface between the first service network and the second service network by invoking a connection creation interface; and providing a network service of the second service network to the first service network by invoking the one or more target application instances and the network interface.

18. The storage medium according to claim 17, wherein the one or more program codes further cause the one or more processors to:

select, based on one or more exclusion tags in the exclusion indication information, one or more excludable application instances corresponding to the one or more exclusion tags, from the one or more original application instances; and determine, based on one or more application instance identifiers in the exclusion indication information, one or more excludable application instances corresponding to the one or more application instance identifiers, from the one or more original application instances.

* * * * *